No. 12,392. REISSUED OCT. 3, 1905.

W. R. CUNNINGHAM.

BRICK OR TILE CUTTING MACHINE.

APPLICATION FILED AUG. 17, 1905.

2 SHEETS—SHEET 1.

Witnesses
B. M. Offutt
C. F. Fowler

Inventor
William R. Cunningham
by J. Walter Fowler
Attorney.

No. 12,392. REISSUED OCT. 3, 1905.

W. R. CUNNINGHAM.

BRICK OR TILE CUTTING MACHINE.

APPLICATION FILED AUG. 17, 1905.

2 SHEETS—SHEET 2.

Witnesses
W. M. Offutt
G. T. Fowler

Inventor
William R. Cunningham
by T. Walter Fowler
Attorney

UNITED STATES PATENT OFFICE.

WILLIAM R. CUNNINGHAM, OF BUCYRUS, OHIO, ASSIGNOR TO THE AMERICAN CLAY MACHINERY COMPANY, OF BUCYRUS, OHIO, A CORPORATION OF NEW JERSEY.

BRICK OR TILE CUTTING MACHINE.

No. 12,392. Specification of Reissued Letters Patent. Reissued Oct. 3, 1905.

Original No. 795,583, dated July 25, 1905. Application for reissue filed August 17, 1905. Serial No. 274,637.

*To all whom it may concern:*

Be it known that I, WILLIAM R. CUNNINGHAM, a citizen of the United States, residing at Bucyrus, in the county of Crawford and State of Ohio, have invented new and useful Improvements in Brick or Tile Cutting Machines, of which the following is a specification.

My invention relates to certain new and useful improvements in machines designed to cut a bar or bars of clay into uniform thicknesses or lengths as they issue from the die of a brick or tile machine, and the particular class of machines herein illustrated is of the rotary automatic type, where the reel which carries the cutting-wires has a variable continuous motion as distinguished from those machines wherein the reel comes to rest after the cutting-wires pass through the bar of clay.

My invention consists of the novel parts and the construction, arrangements, and combinations of parts, which I will hereinafter describe and claim.

Figure 1:
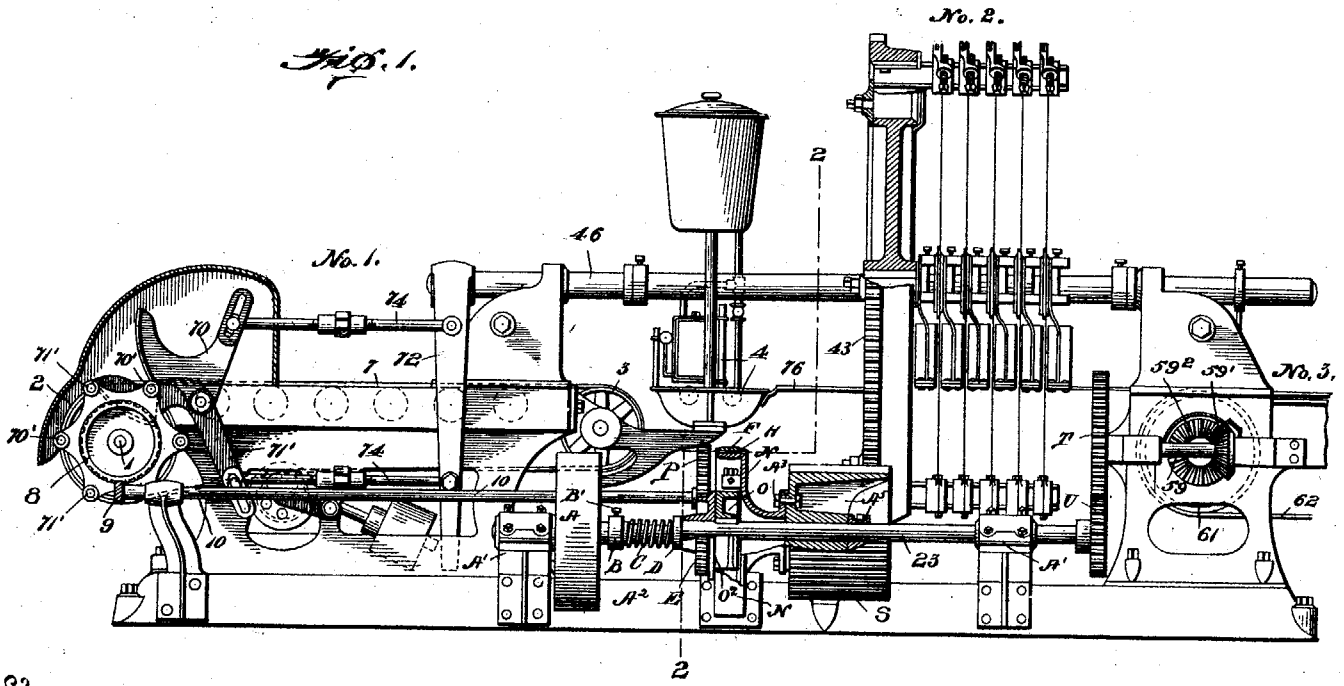
Figure 2:
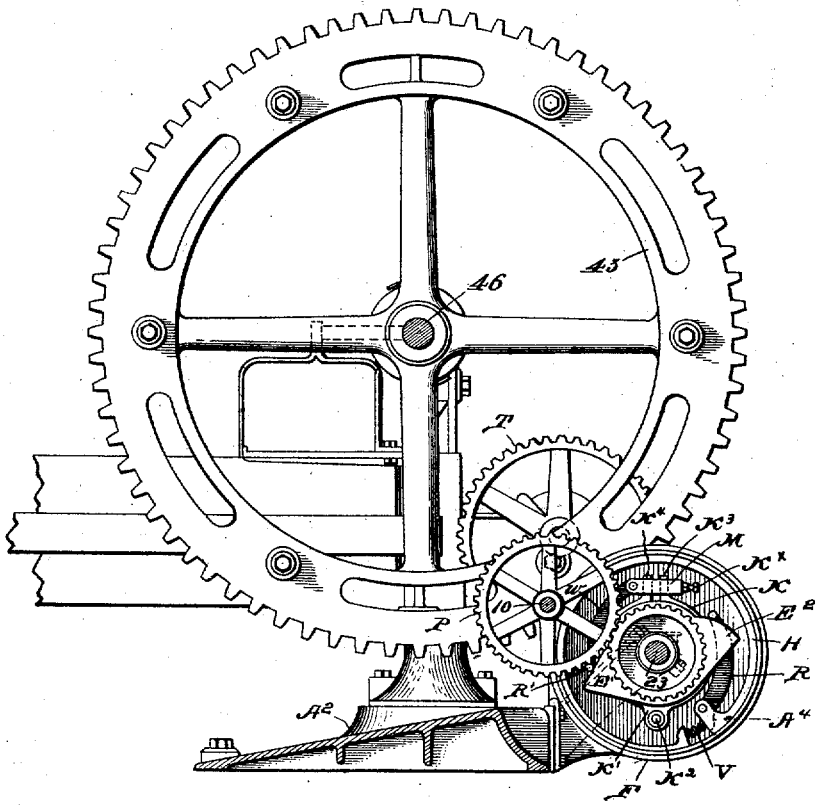

In the accompanying drawings, forming part of my specification, and in which similar reference characters indicate like parts throughout both views, Figure 1 represents a side elevation of my improved brick and tile cutting machine with parts broken away to show in section the automatic friction driving and governing device. Fig. 2 is a cross-sectional view on the line 2 2 of Fig. 1.

The present invention is an improvement on my former patent, No. 775,800, dated November 22, 1904, and as the present improvements relate almost exclusively to the manner of driving and governing the speed of the cutting-wire reel I will refer only briefly to the principal parts of the prior patented structure, which are shown herein, it being understood that the construction and operation of said parts follow more or less closely the corresponding parts of the prior patent.

Referring to Fig. 1, which shows the organized machine, it will be seen that, as in the prior patent, the present machine comprises three divisions or sections—namely, a measuring-table section, No. 1, a carriage and cutting section, No. 2, and a separating or off-bearing section, No. 3—said sections being suitably secured and provided with such complementary parts as go to make up a complete machine of the described type.

The measuring-table section includes the measuring-drum 2, fixed to the shaft 1, said shaft having fixed to it a spiral gear 8, which meshes with a spiral pinion 9 on a longitudinal governor-shaft 10. Around the measuring-drum 2 and a drum 3 at the inner end of the table-section passes the measuring-belt 7, upon which the column or bar of clay is received from a suitable folding-die or equivalent device. (Not shown.)

The foregoing devices, as well as the cam-rockers 70 71, the tappets 70′ 71′, the longitudinally-slidable shaft 46, with its arm 72 and connecting-rods 74, the lubricating devices 4, the carriage and cutting devices which constitute the section No. 2, and the off-bearing belt or apron 62, are similar in all essentials, both in construction and operation, to the corresponding parts of the said prior patent. Therefore a more detailed explanation of these parts seems unnecessary at this time.

The main driving-pulley A is appropriately keyed on the shaft 23, which is itself journaled in bearings A′ A′, bolted to the base of the main frame $A^2$, as shown in Fig. 1. On the inner end of the shaft 23 is fixed a spur-pinion U, which is in mesh with a spur gear-wheel T, mounted on a longitudinal shaft 59, having a miter-gear 59′, which meshes with a similar gear $59^2$ on the shaft of the pulley 61, around which the off-bearing belt 62 passes. This method of connection finds its full equivalent in the aforesaid prior patent.

Loosely mounted on the shaft 23 is an elongated pinion S, to the end of which is appropriately bolted, by means of bolts $A^3$, a plate-flange N, and to this is bolted at $A^4$ a split or expansible ring H, having a spring V located between its separated or split ends. By bolting one end of this split ring the remaining portion of the ring is capable of being expanded into contact with the contiguous inner wall or surface of a stationary brake-band F, as I will hereinafter describe.

To the aforesaid flange N is also secured a second split ring K, which lies interior to the ring H and is provided with a centrally-disposed lug K′, through which passes a bolt $K^2$, by which said second ring is secured in place, said lug being located on the ring midway between or opposite to the point where the ring is split or severed. The split ends of the second ring K are formed or provided with the lugs or projections $K^3 K^4$, which are designed to be embraced by a stirrup M of appropriate construction, said stirrup having a forked or open end within which is pivotally mounted a curved lever W, the short arm of which operates against the lug $K^4$, while the longer arm extends within the range of action of a suitable operating-cam surface, as I will hereinafter indicate. The position of the lever W may be adjusted when desired by means of a set-screw $K^\times$, mounted in the opposite end of the stirrup.

A curved lever-arm R is disposed on the opposite side of the cam-gear E and has one end pivoted in the fixed end of the split ring H and the opposite end extending into the range of action of the cam $E^2$, said levers W and R extending in opposite directions, as shown.

Securely bolted to the base-frame $A^2$ is the stationary friction-band F, and keyed to the aforesaid driving-shaft 23 is a friction-driver O in the form of a flanged disk having a plain flat face provided with frictional surface, which may be of leather or other appropriate material. Opposing the friction-driver O is the corresponding face of a gear E, which is formed rigid with a disk having at one side an extending cam E′ and having at the opposite side a cam $E^2$, said gear being loosely mounted on the shaft 23, and said disk, which, in fact, is a part of the gear, having its face opposing the friction-surface of the driver O and adapted to be pressed thereagainst by means of a spring C, coiled around the shaft 23 and confined between a wearing-collar and spring-seat D and an adjusting-collar B, whose position on the shaft may be fixed by means of a set-screw B′. This arrangement affords means for regulating the tension of the spring C and the pressure of the friction-surface of the cam-gear against the opposing friction-driver O. The cam-disk of gear E is, as before stated, provided with cam or incline E′, and the long arm of the aforesaid lever W extends into the range of action of said cam or incline, whereby said lever is operated to contract the split ring K when the incline rides under the end of the lever W, which lever may have a laterally-projecting pin or projection R′. The other cam $E^2$ of the cam-disk is also designed to ride under the end of the lever R or a pin R′ therein to expand the split ring H against the inner surface of the stationary ring F, as I will hereinafter describe.

Mounted for longitudinal movement on the shaft 23 is a collar $A^5$, whose position on the shaft may be fixed at any suitable point by means of a set-screw, whereby the elongated pinion S is held in its proper position. The friction-driver O serves as an end stop or abutment for the flange N, and thereby limits the end movement of the pinion in that direction.

In register with the cam-gear E is a driving-gear P, fixed on the governor-shaft 10, before described, which gear P is actuated by the spiral gearing 8 and 9 of the measuring-table section of the machine.

The operation of the machine may be generally described as follows: The driving-pulley A is driven from a suitable counter or line shaft at a speed sufficient to take care of the maximum capacity of the cutting mechanism. This pulley drives the shaft 23 and the main friction-wheel O, which is fixed to it. As the bar of clay issues from the usual forming-die it is received upon the measuring-belt 7, which is thus started and which results in the measuring-drum 2, the shaft 1, the spiral gear 8 9, the governing-shaft 10, the driving-gear P, and the cam-gear E being set in motion. This action also brings the cam or incline E′ of the cam-gear E in contact with the long arm of the lever W, thereby rocking this lever and causing the short arm thereof to contract the split friction-band K and cause it to grip said ring on the live friction-wheel O. This results in the flange N and the elongated pinion S being set in motion, in turn revolving the large gear 43 of the cutting-section of the machine, and which gear carries the cutting-wire attachments, as in my aforesaid prior patent. The arrangement of the parts is such that the large gear-wheel 43 and its cutting-wires revolve in exact register with the moving bar of clay to sever it into pieces of uniform length or thickness. At times the driving-pulley A and its shaft 23 will run at a higher speed than is necessary for the loosely-mounted elongated pinion S to revolve in order to keep the gear-ring 43 in correct register with the moving bar of clay, and the flange N, which carries the friction-rings K and H, with their levers, will run faster than the gear E, which is governed by the bar of clay. This would relieve the lever W from the cam or incline E′ and cause the long arm of the second lever R to be engaged by the cam $E^2$, whereby the friction-band H will be expanded and thrown into strong frictional engagement with the stationary brake-band F, and the speed of the long pinion S and large gear-wheel 43 will be retarded until the bar of clay through the governing-shaft 10 and its gears will revolve the cam-gear E sufficiently to contract the brake-band K through the cam or incline E′ and lever W, as before described. As this engagement is occurring the brake-band H is released from its frictional engagement with the stationary brake-band. In this manner the gear-wheel 43 and cutting-wires are kept in correct register with the variable movement of the bar of clay, and there is no danger of the bar of clay being distorted or pulled apart. The leather washer $O^2$ acts as a frictional aid to the bar of clay, and the tension of the spring C is set so that when the bar of clay is removed the driving-pulley A and its shaft 23 will drive the measuring-belt 7 through the governor-shaft 10, and when the clay column runs out of the measuring-belt and extends from the die of the brick-machine to the apron 78 of the cutting-section of the machine the weight of said column bearing on the belt 7 will create sufficient friction to prevent the belt slipping, and thereby causing the cam-gear E to slip on the leather friction-washer $O^2$ by said gear being held in check through the train of gears, which latter I prefer to designate as a "governing device."

From the foregoing description it will appear that I obtain a decided advantage in this class of machines by arranging the friction devices so that the pressure on the driving-friction is just sufficient to carry the cutting-wires and the parts that support them through the bar of clay. If the consistency of the bar of clay is softer at one time than another, the pressure on the live friction-wheel O is regulated accordingly. When the bar of clay is not in motion, the friction-wheel O is disengaged entirely, which prevents it from undue wear. I also employ one friction-ring for driving the parts and utilize the other friction-ring as a brake, the rings being secured to the same flange or support and said rings being so arranged that as one acts as a brake the other acts as a driver.

It will also be noticed that the relative arrangement of the mechanism is such that when the bar of clay extends from the die to the off-bearing belt over the platens and belt 7 there is a complete circuit, so that one part cannot move without moving the bar of clay. Therefore any slight variation in the movement of the bar of clay causes the wires to revolve in correct register with the travel of the clay column.

Having thus described my invention, what I claim as new, and desire to secure by Letters Patent, is—

1. In a brick and tile cutting machine the combination of clay-measuring mechanism, clay-cutting mechanism, and a governing mechanism for causing the cutting devices to continuously revolve in register with and by the travel of the bar of clay said governing mechanism comprising a fixed drive-friction and a loose friction operable together in the same direction, and said loose friction yieldable relative to the drive-friction under the variations of the travel of the bar of clay.

2. In a brick and tile cutting machine the combination of clay-measuring mechanism, clay-cutting mechanism and a governing mechanism for causing the cutting devices to continuously revolve in register with and by the travel of the bar of clay said governing mechanism comprising a fixed drive-friction and a loose friction operable together in the same direction and said loose friction yieldable relative to the drive-friction under the variations of the travel of the bar of clay, and a clutch mechanism controlled by the loose friction and actuating to grip the drive-friction with a pressure which automatically responds to and varies with the travel of the bar of clay.

3. In a brick and tile cutting machine the combination with clay-measuring mechanism, clay-cutting mechanism and a governing mechanism between the measuring and cutting mechanisms for causing the cutting devices to continuously revolve in register with and by the travel of the bar of clay said governing mechanism comprising a fixed drive-friction and a loose friction operable together in the same direction and said loose friction yieldable relative to the drive-friction under the variations of the travel of the bar of clay, a clutch mechanism controlled by the loose friction and actuating to grip the drive-friction with a pressure which automatically responds to and varies with the travel of the bar of clay, and a brake mechanism carried in unison with the clutch mechanism and controlled by said loose friction, and adapted to retard the speed of the cutting mechanism.

4. In a brick and tile cutting machine the combination with a clay-measuring-table mechanism and a revoluble cutting mechanism, of an intermediate governing mechanism comprising a pair of members in frictional contact and normally rotatable at one speed in the same direction, one of said members being a driver and the other being within the control of the travel of the bar of clay and adapted to move relative to the companion driving member when a variation in speed between the members occurs, and a clutch mechanism between the cutting mechanism and said driving member and adapted to engage the latter, said clutch mechanism controlled by said movable friction member whereby the pressure of the clutch on the driving friction member varies with and responds to the variations in the travel of the bar of clay, and the cutting devices revolve in register with said bar of clay.

5. In a brick and tile cutting machine, the combination with a measuring-table mechanism, a governor-shaft operable therefrom and provided with a gear-wheel, and a revoluble cutting mechanism, of a drive-shaft having a driving friction-wheel fixed to it, a gear-wheel loose on said drive-shaft and having a surface to engage said driving friction-wheel, said gear-wheel meshing with the first-named gear-wheel, and adapted to slip relative to the driving-friction when a variation in speed occurs between the two, a long pinion loose on the drive-shaft, a clutch mechanism carried by said long pinion, and means between the clutch mechanism and the loose friction-gear and operable by the latter to cause the clutch to engage the driving friction-wheel with a pressure which substantially varies with the travel of the measuring mechanism whereby the cutting mechanism is revolved in register with and by the travel of the bar of clay.

6. In a brick and tile cutting machine the combination of clay-measuring-table mechanism, a governor-shaft operable thereby and having a gear fixed to it, a drive-shaft having a friction-wheel fixed to it, a long pinion loose on the drive-shaft and carrying a friction-clutch member which substantially embraces said friction-wheel, a cutting-reel having a gear-wheel engaged by said long gear, a second friction-wheel, engaging the first-named friction-wheel and loose on said drive-shaft whereby it may slip relative to the first-named friction-wheel when one of the friction-wheels travels at a higher speed than the other, said loose friction-wheel meshing with the gear on the governor-shaft whereby its speed is controlled by substantially the travel of the bar of clay, means carried by the loose friction-wheel and actuating the clutch to cause it to grip the live friction-wheel and thus rotate the clutch and the long pinion and cause the cutting-reel to revolve in register with the travel of the bar of clay, said loose friction-wheel automatically increasing and decreasing the pressure of the clutch on the live friction-wheel in response to variations in the travel of the bar of clay whereby the cutting mechanism operates in register with the travel of the clay.

7. In a brick and tile cutting machine the combination of a clay-measuring mechanism including a governor-shaft and a gear thereon, a cutting-reel having a gear-wheel, a drive-shaft having a friction-wheel fixed to it, a long pinion loose on the drive-shaft and engaging the reel-gear, a plate-flange carried by the pinion and having a split ring inclosing the fixed friction-wheel and normally disengaging the same, a friction-wheel loose on the drive-shaft and in frictional engagement with the fixed friction-wheel, said loose friction-wheel engaged by the gear of the governor-shaft, means including a cam member carried by the loose gear and a lever carried by the plate-flange whereby when said loose gear is moved relative to the plate-flange the split ring is caused to grip said fixed gear with a pressure which varies with the travel of the bar of clay, and the cutting-reel is actuated in register with the travel of the clay.

8. In a brick and tile cutting machine the combination of a clay-measuring mechanism including a governor-shaft and a gear thereon, a cutting-reel having a gear-wheel, a drive-shaft having a friction-wheel fixed to it, a long pinion loose on the drive-shaft and engaging the reel-gear, a plate-flange carried by the pinion and having a split ring inclosing the fixed friction-wheel and normally disengaging the same, a friction-wheel loose on the drive-shaft and in frictional engagement with the fixed friction-wheel, said loose friction-wheel engaged by the gear of the governor-shaft, means including a cam member carried by the loose gear and a lever carried by the plate-flange whereby when said loose gear is moved relative to the plate-flange the split ring is caused to grip said fixed gear with a pressure which varies with the travel of the bar of clay, and the cutting-reel is actuated in register with the travel of the clay, a second split ring carried by the plate-flange, a lever pivoted to said second ring, a second cam carried by the loose friction-gear and adapted to actuate the second lever to cause it to expand the second split ring when the first split ring releases its grip on the fixed friction-wheel, and a stationary brake-band against which the said second split band is expanded to retard the movement of the cutting mechanism.

In testimony whereof I have hereunto set my hand in presence of two subcribing witnesses.

WILLIAM R. CUNNINGHAM.

Witnesses:

J. L. De Lashmutt,

R. O. Perrott.